US012594611B2

(12) United States Patent
Takatake et al.

(10) Patent No.: US 12,594,611 B2
(45) Date of Patent: Apr. 7, 2026

(54) ROTARY TOOL AND METHOD FOR MANUFACTURING MACHINED PRODUCT

(71) Applicant: KYOCERA CORPORATION, Kyoto (JP)

(72) Inventors: Yusaku Takatake, Higashiomi (JP); Masahiro Yoshida, Higashiomi (JP)

(73) Assignee: KYOCERA CORPORATION, Kyoto (JP)

( * ) Notice: Subject to any disclaimer, the term of this patent is extended or adjusted under 35 U.S.C. 154(b) by 654 days.

(21) Appl. No.: 17/625,095

(22) PCT Filed: Jun. 11, 2020

(86) PCT No.: PCT/JP2020/022964
§ 371 (c)(1),
(2) Date: Jan. 6, 2022

(87) PCT Pub. No.: WO2021/005946
PCT Pub. Date: Jan. 14, 2021

(65) Prior Publication Data
US 2022/0288702 A1      Sep. 15, 2022

(30) Foreign Application Priority Data

Jul. 9, 2019    (JP) ................................. 2019-127317

(51) Int. Cl.
*B23B 51/02*          (2006.01)
*B23B 51/00*          (2006.01)

(52) U.S. Cl.
CPC ...... *B23B 51/009* (2013.01); *B23B 2251/204* (2013.01); *B23B 2251/241* (2013.01); *B23B 2251/40* (2013.01)

(58) Field of Classification Search
CPC ... B23B 51/009; B23B 51/0063; B23B 51/02; B23B 2251/40; B23B 2251/406;
(Continued)

(56) References Cited

U.S. PATENT DOCUMENTS 151,450 A  *  5/1874  Tolman ................... B23B 51/02
                                                                        408/230
237,013 A  *  1/1881  Hammond .............. B23B 51/02
                                                                        76/108.1
(Continued)

FOREIGN PATENT DOCUMENTS

FR              725505  A  *  5/1932
JP        2003094220  A  *  4/2003
(Continued)

*Primary Examiner* — Ryan Rufo
(74) *Attorney, Agent, or Firm* — HAUPTMAN HAM, LLP

(57)                    ABSTRACT

A rotary tool may include a base. The base may be extended from a first end to a second end. The base may include a first part and a second part. The first part may include the first end. The second part may have a larger outer diameter than the first part. The first part may include a first flute. The second part may include a second flute. In a first cross section of the first part, the first flute may include a first bottom part. A center of a first imaginary circle overlapping with the first bottom part may be located outside a circumscribed circle of the first part. In a second cross section of the second part, the second flute may include a second bottom part. A center of the second imaginary circle overlapping with the second bottom part may be located inside a circumscribed circle of the second part.

10 Claims, 12 Drawing Sheets

(58) Field of Classification Search
 CPC .......... B23B 2251/60; B23B 2251/606; B23B 2251/241; B23B 2251/242; B23B 2251/202; B23B 2251/204; B23B 2251/205
 See application file for complete search history.

(56) References Cited

U.S. PATENT DOCUMENTS

| | | | | |
|---|---|---|---|---|
| 805,170 | A * | 11/1905 | Thomas ................. | B23Q 11/10 |
| | | | | 408/56 |
| 1,387,994 | A * | 8/1921 | Lewis .................... | B23B 51/08 |
| | | | | D15/139 |
| 9,039,336 | B2 * | 5/2015 | Von Puttkamer ....... | B24B 19/04 |
| | | | | 408/230 |
| 10,065,250 | B2 * | 9/2018 | Oguri ...................... | B23B 51/10 |
| 11,103,933 | B2 * | 8/2021 | Yamamoto ............ | B23B 51/108 |
| 2010/0215452 | A1 | 8/2010 | Jindai et al. | |
| 2016/0074945 | A1 * | 3/2016 | Achleitner .............. | B23B 51/02 |
| | | | | 408/230 |
| 2016/0346846 | A1 | 12/2016 | Oguri | |
| 2019/0015892 | A1 * | 1/2019 | Domani ................. | B23P 15/32 |

FOREIGN PATENT DOCUMENTS

| | | | | |
|---|---|---|---|---|
| JP | 2003191116 | A | * | 7/2003 |
| JP | 2003334709 | A | * | 11/2003 |
| JP | 200490197 | A | | 3/2004 |
| JP | 2006346832 | A | * | 12/2006 |
| JP | 201469246 | A | | 4/2014 |
| JP | 2016068195 | A | | 5/2016 |
| WO | 2009054400 | A1 | | 4/2009 |
| WO | 2015118684 | A1 | | 8/2015 |

* cited by examiner

ROTARY TOOL AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2020/022964 filed on Jun. 11, 2020, which claims priority to Japanese Patent Application No. 2019-127317, filed on Jul. 9, 2019, which is entirely incorporated herein by reference.

TECHNICAL FIELD

The present disclosure may generally relate to a rotary tool and a method for manufacturing a machined product, which are used for a cutting process of a workpiece. Specific examples of the rotary tool may include drills and reamers.

BACKGROUND

Drills discussed in Japanese Unexamined Patent Publication No. 2004-090197 (Patent Document 1) and Japanese Unexamined Patent Publication No. 2014-069246 (Patent Document 2) may be embodiments of the rotary tool used for subjecting a workpiece, such as metal, to a cutting process by milling process. The drill discussed in Patent Document 1 may include two cutting edges at a front end thereof. The drill discussed in Patent Document 2 may include three cutting edges at a front end thereof. The drill discussed in Patent Document 2 may have a larger number of cutting edges than the drill discussed in Patent Document 1. This may lead to a small thickness of chips, thereby reducing cutting resistance.

The cutting resistance may decrease with increasing the number of cutting edges. However, chip discharge performance may deteriorate with increasing the number of cutting edges. Hence, there is a desire for a rotary tool having enhanced chip discharge performance while reducing cutting resistance.

SUMMARY

A rotary tool in a non-limiting aspect of the present disclosure may include a base. The base may be extended along a central axis from a first end to a second end. The base may include a first part and a second part. The first part may be located so as to include the first end. The second part may be located closer to the second end than the first part, and may have a larger outer diameter than the first part. The first part may include a first cutting edge and a first flute. The first cutting edge may be located on the first end. The first flute may be extended from the first cutting edge toward the second end. The second part may include a second cutting edge and a second flute. The second cutting edge may be located on an end part on a side of the first end. The second flute may be extended from the second cutting edge toward the second end.

In a first cross section of the first part orthogonal to the central axis, the first flute may include a first bottom part having a circular arc shape and including a portion closest to the central axis. An imaginary circle overlapping with the first bottom part may be a first imaginary circle. A center of the first imaginary circle may be located outside a circumscribed circle of the first part. In a second cross section of the second part orthogonal to the central axis, the second flute may include a second bottom part having a circular arc shape and including a portion located closest to the central axis. An imaginary circle overlapping with the second bottom part may be a second imaginary circle. A center of the second imaginary circle may be located inside a circumscribed circle of the second part.

EMBODIMENTS

<Rotary Tools>

Figure 1:
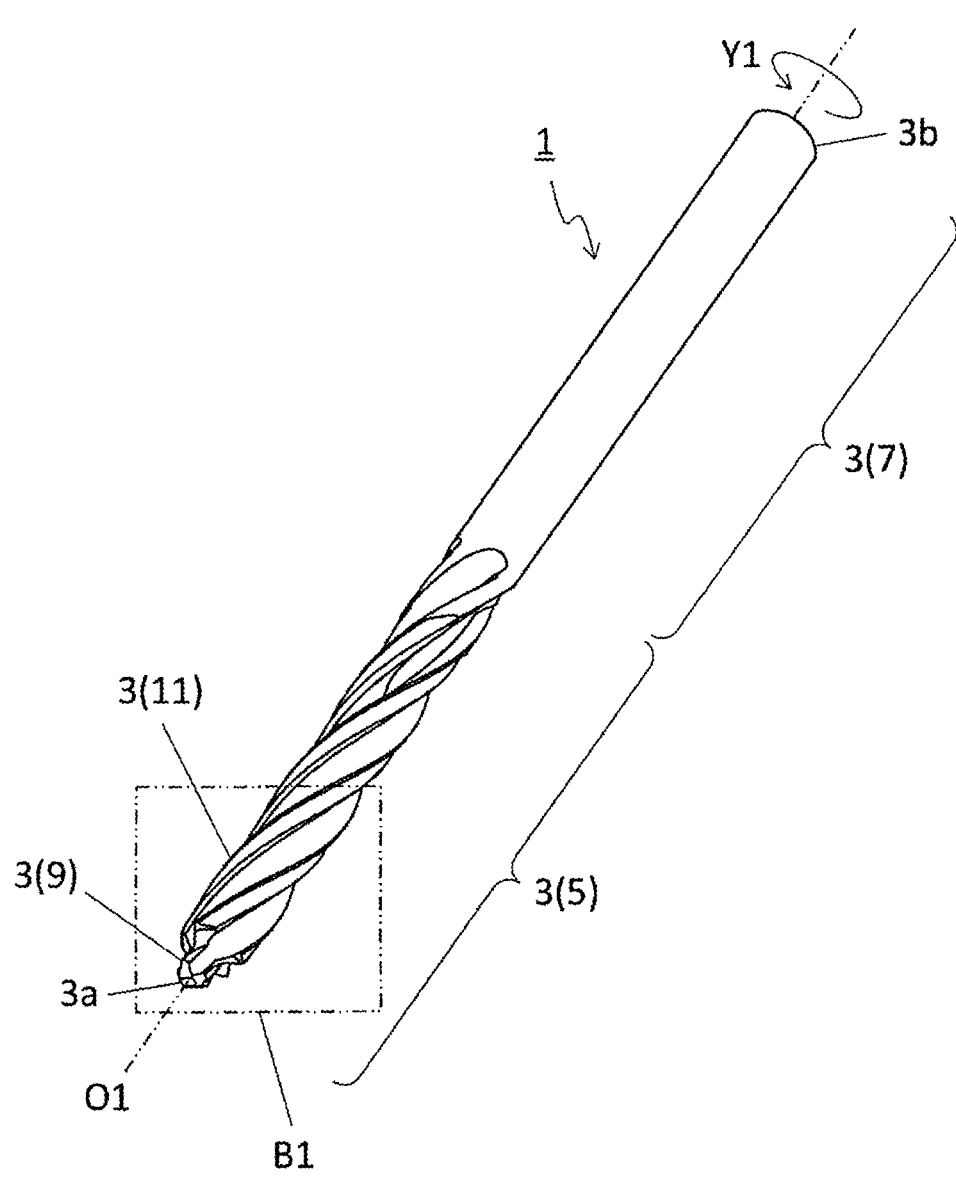
FIG. 1 is a perspective view illustrating a rotary tool (drill) in a non-limiting embodiment of the present disclosure.
Figure 2:
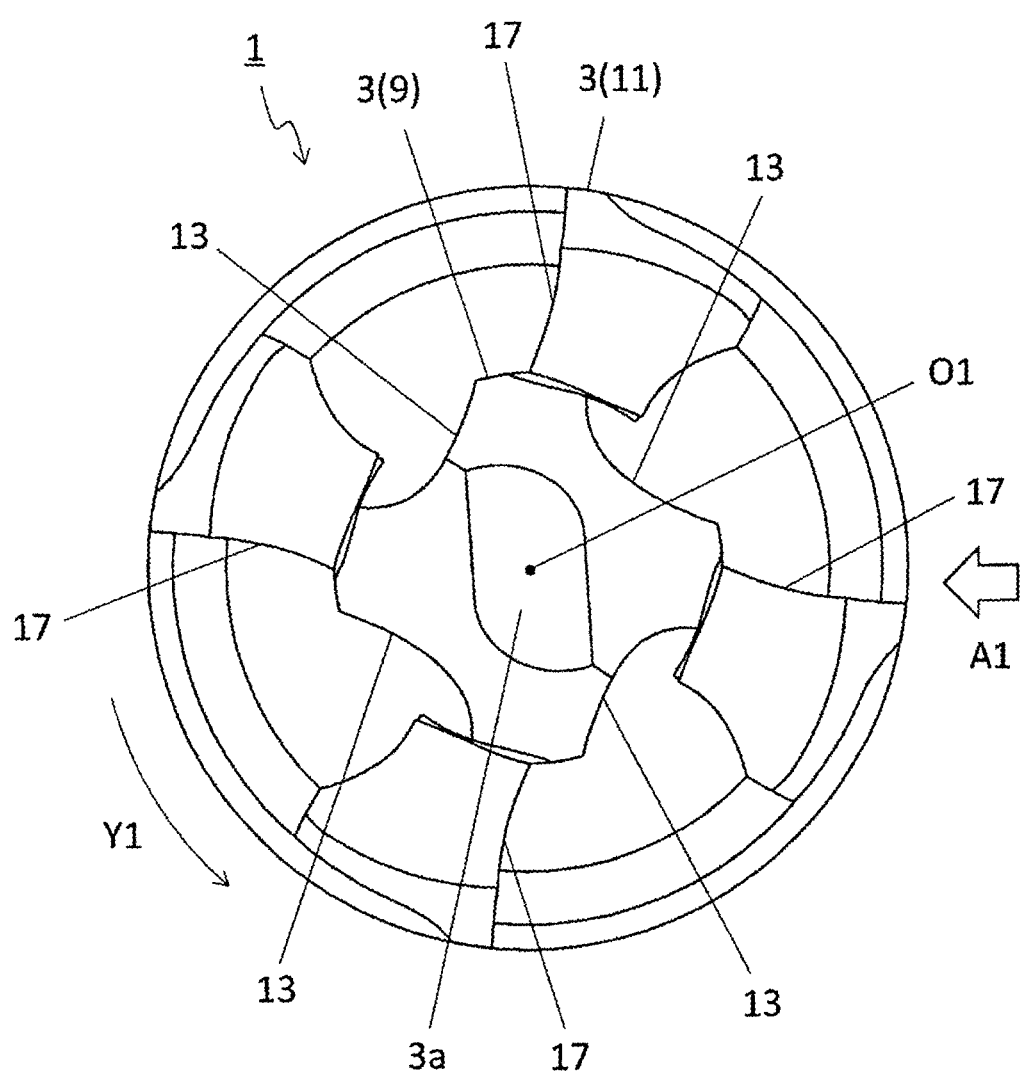
FIG. 2 is a plan view of the rotary tool illustrated in FIG. 1 as viewed from a side of a first end.
Figure 3:
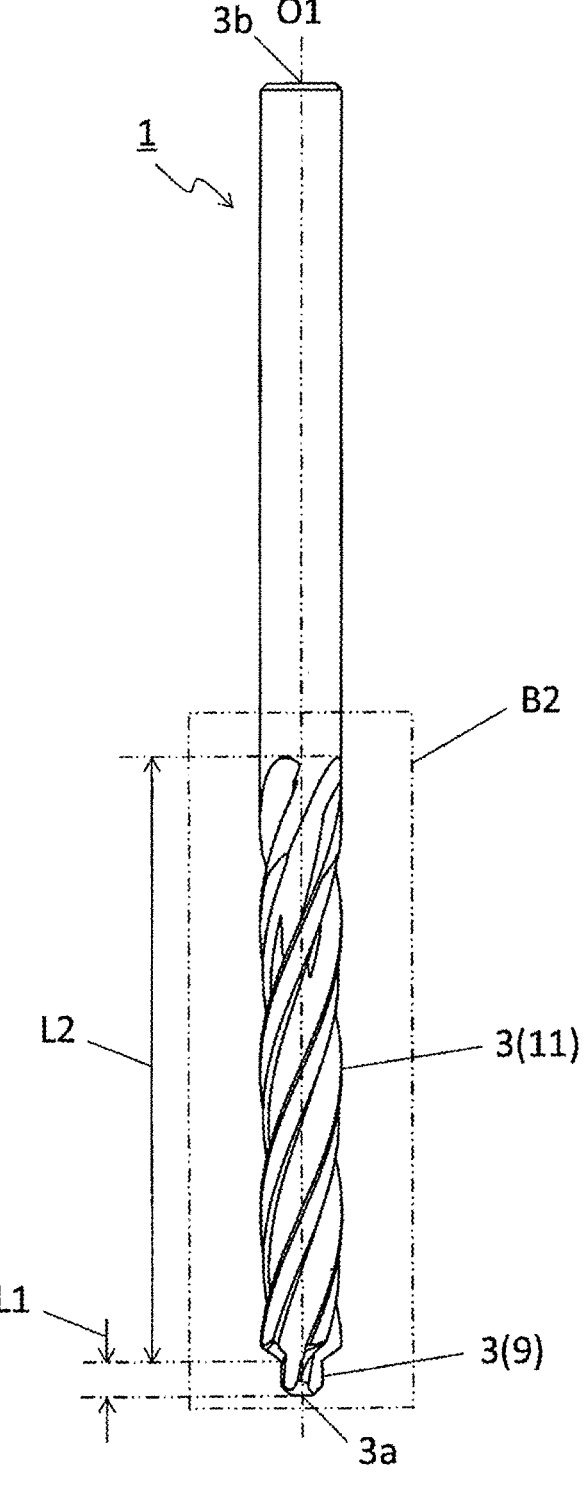
FIG. 3 is a side view of the rotary tool illustrated in FIG. 2 as viewed from an A1 direction.
Figure 4:
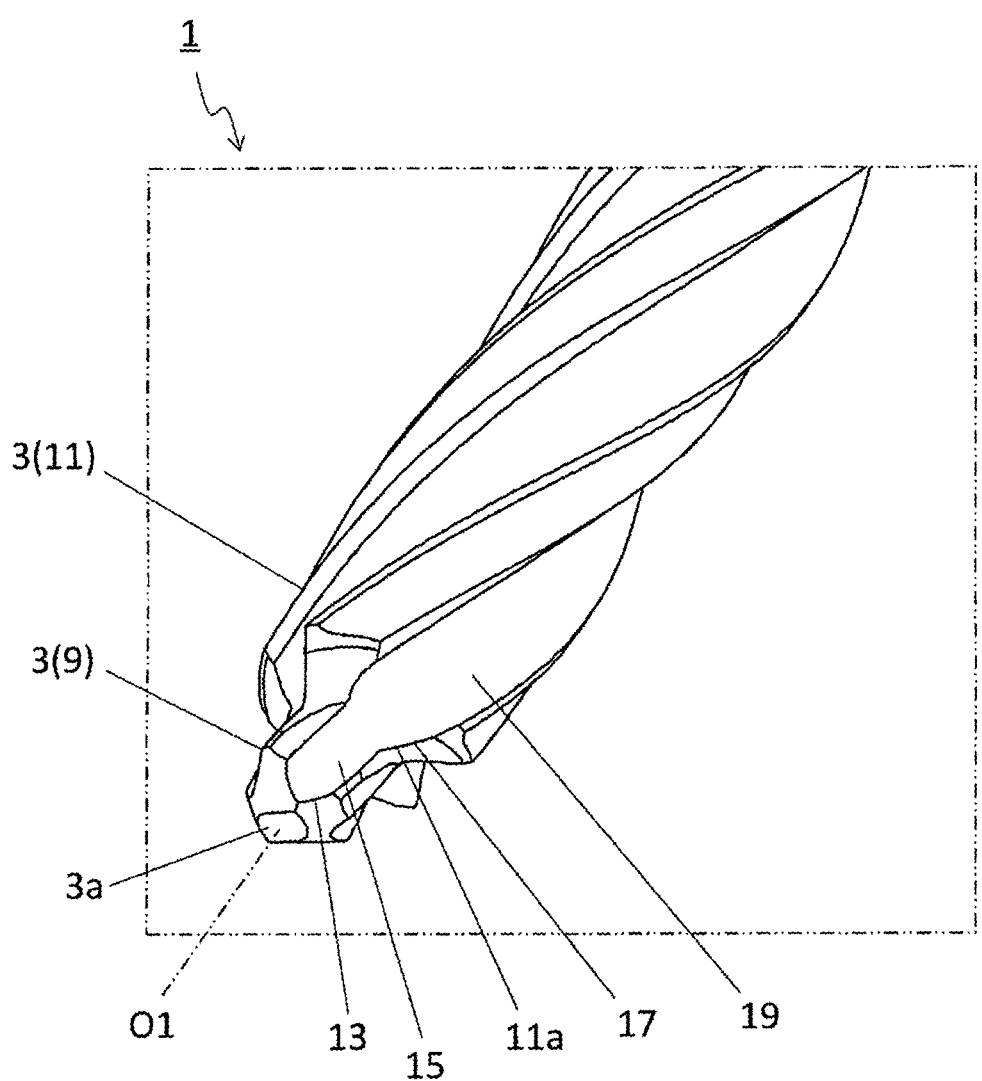
FIG. 4 is an enlarged view of a region B1 illustrated in FIG. 1.
Figure 5:
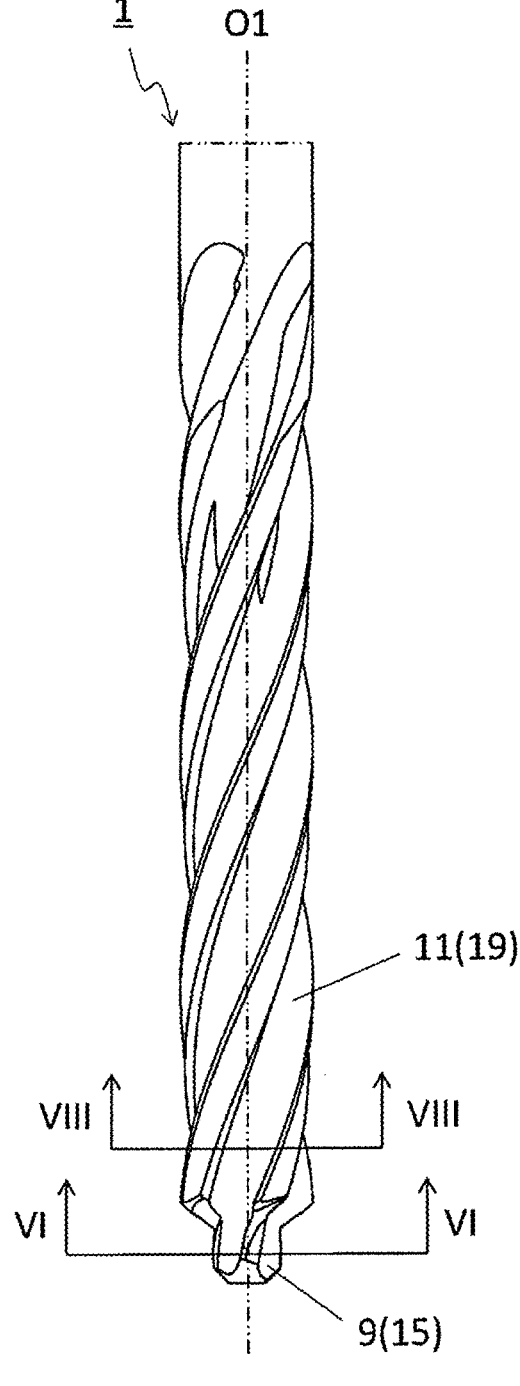
FIG. 5 is an enlarged view of a region B2 illustrated in FIG. 3.

A rotary tool 1 in a non-limiting embodiment of the present disclosure may be described in detail with reference to the drawings. For convenience of description, the drawings referred to in the following may illustrate, in simplified form, only main members necessary for describing the embodiments. The rotary tool 1 may therefore include any arbitrary structural member not illustrated in the drawings referred to. Dimensions of the members in each of the drawings may faithfully represent neither dimensions of actual structural members nor dimensional ratios of these members.

FIGS. 1 to 9 may illustrate a two-step drill as an embodiment of the rotary tool 1. The rotary tool 1 is not limited to the two-step drill, and may be, for example, three or more step drill. The rotary tool 1 is not limited to the drill, and may be, for example, an end mill and reamer.

The rotary tool 1 may include a base 3 as in a non-limiting embodiment illustrated in FIG. 1. The base 3 may be extended along a central axis (rotation axis) O1 from a first end 3a to a second end 3b. More specifically, the base 3 may have a bar shape extended along the central axis O1 from the first end 3a to the second end 3b. In general, the first end 3a may be called "a front end," and the second end 3b may be called "a rear end." The central axis O1 may be an axis passing through a center of the first end 3a to a center of the second end 3b. The base 3 may be rotatable around the central axis O1. An arrow Y1 in FIG. 1 and the like may indicate a rotation direction of the central axis O1.

The base 3 may include a cutting part 5 and a shank part 7. The shank part 7 may be a part that can be held by a spindle to be rotated in a machine tool. The shank part 7 may be designed according to a shape of the spindle in the machine tool. Examples of the shape of the shank part 7 may include straight shank, long shank, long neck and tapered shank. Examples of the machine tool that holds the shank part 7 may include hand drills and machining centers.

The cutting part 5 may be located on a side of the first end 3a relative to the shank part 7. The cutting part 5 may include a cutting portion which is brought into contact with a workpiece and plays a main role in a cutting process of the workpiece.

An outer diameter D of the cutting part 5 is not limited to a specific value. For example, a maximum value of the outer diameter D may be set to 4-50 mm. A length L of the cutting part 5 in a direction along the central axis O1 may be set to L=1.5 D to L=12 D.

The base 3 may include a first part 9 and a second part 11. The first part 9 may be located so as to include the first end 3a. The second part 11 may be located closer to the second end 3b than the first part 9, and may have a larger outer diameter than the first part 9.

The first part 9 may be usable for carrying out a roughing process. The second part 11 may be usable for carrying out a finishing process. The first part 9 and the second part 11 may be located in the cutting part 5. The first part 9 and the second part 11 may be the above cutting portion.

An outer diameter of each of the first part 9 and the second part 11 is not limited to a specific value. For example, the outer diameter of the first part 9 may be set to 2-25 mm. The outer diameter of the second part 11 may be set to 4-50 mm.

A length L1 of the first part 9 in a direction along the central axis O1 may be equal to or different from a length L2 of the second part 11 in the direction along the central axis O1. If the length L1 is smaller than the length L2 as in a non-limiting embodiment illustrated in FIG. 3, the rotary tool 1 may offer high straightline stability during a cutting process.

The first part 9 may include a first cutting edge 13 and a first flute 15. The first cutting edge 13 may be located on the first end 3a. The first flute 15 may be extended from the first cutting edge 13 toward the second end 3b.

The first cutting edge 13 may be usable for cutting out the workpiece during the cutting process. The number of the first cutting edge 13 may be at least one or a plural number. If the number of the first cutting edge 13 is the plural number, the number thereof may be 2 to 6. These points may also be true for a second cutting edge described later. The rotary tool 1 may be a so-called 4-cutting edge drill as in the non-limiting embodiment illustrated in FIG. 1.

In cases where the number of the first cutting edge 13 is the plural number, the first cutting edges 13 may be located so as to have rotational symmetry relative to the central axis O1 in a plan view from a side of the first end 3a. Specifically, if the number of the first cutting edge 13 is four as in the non-limiting embodiment illustrated in FIG. 2, the four first cutting edges 13 may be located so as to have 90-degree rotational symmetry relative to the central axis O1 in a plan view from a side of the first end 3a. This may lead to enhanced straightline stability of the rotary tool 1 when cutting out the workpiece. These points may also be true for the second cutting edge.

The first flute 15 may be usable for discharging chips generated by the first cutting edge 13 to outside. The number of the first flute 15 may be at least one or may be a plural number. The number of the first flute 15 may be equal to the number of the first cutting edge 13. These points may also be true for a second flute described later.

The first flute 15 may directly connect to the first cutting edge 13. This may lead to enhanced biting performance against the workpiece. The first flute 15 may connect to the first cutting edge 13 with a rake surface interposed therebetween. This may contribute to a stable discharge direction of the chips generated by the first cutting edge 13. These points may also be true for the second flute.

The first flute 15 may be extended parallel to the central axis O1, or may be twisted around the central axis O1. In other words, the first flute 15 may be extended spirally on the basis of the central axis O1. These points may also be true for the second flute.

The second part 11 may include a second cutting edge 17 and a second flute 19. The second cutting edge 17 may be located at an end portion 11a on a side of the first end 3a in the second part 11 as in a non-limiting embodiment illustrated in FIG. 4. The second flute 19 may be extended from the second cutting edge 17 toward the second end 3b.

The second cutting edge 17 may be usable for increasing an inner diameter of a hole formed by the first cutting edge 13. The second cutting edge 17 may be located closer to an outer periphery than the first cutting edge 13 in a plan view from a side of the first end 3a. The number of the second cutting edge 17 may be equal to the number of the first cutting edge 13. At least a part of the second flute 19 may connect to the first flute 15, or may be located away from the first flute 15.

Figure 6:
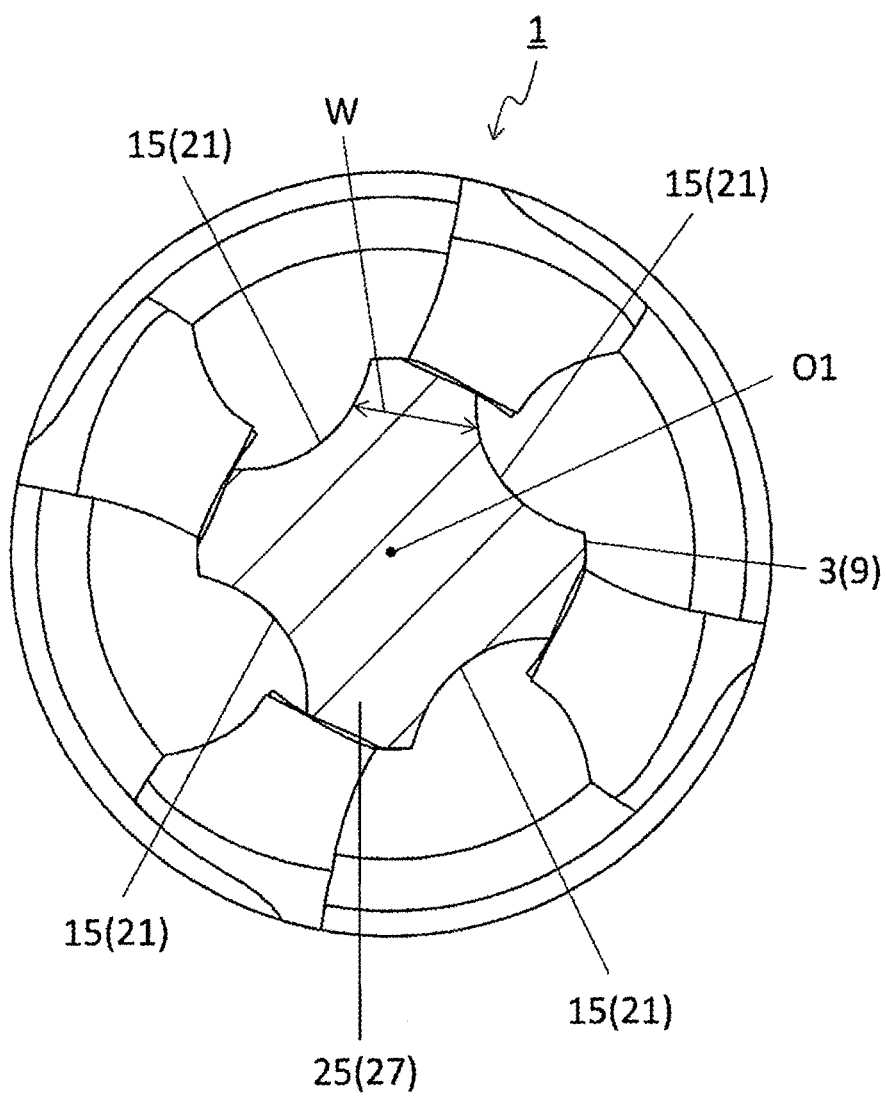
FIG. 6 is a sectional view taken along the line VI-VI in the rotary tool illustrated in FIG. 5.

The first flute 15 may include a first bottom part 21 having a circular arc shape and including a portion located closest to the central axis O1 in a first cross section of the first part 9 orthogonal to the central axis O1, as in a non-limiting embodiment illustrated in FIG. 6. An imaginary circle overlapping with the first bottom part 21 may be a first imaginary circle C11 in the first cross section as in a non-limiting embodiment illustrated in FIG. 7. A center O11 of the first imaginary circle C11 may be located outside a circumscribed circle C12 of the first part 9.

The first part 9 where the first cutting edge 13 and the first flute 15 are located may have a smaller outer diameter than the second part 11. Therefore, a space that permits passage of the chips generated by the first cutting edge 13 in the first part 9 may tend to be limited. If the center O11 of the first imaginary circle C11 is located as described above, the chips generated by the first cutting edge 13 may tend to be moderately curved when passing through the first flute 15. Hence, chip clogging may be less likely to occur in the first flute 15.

Figure 8:
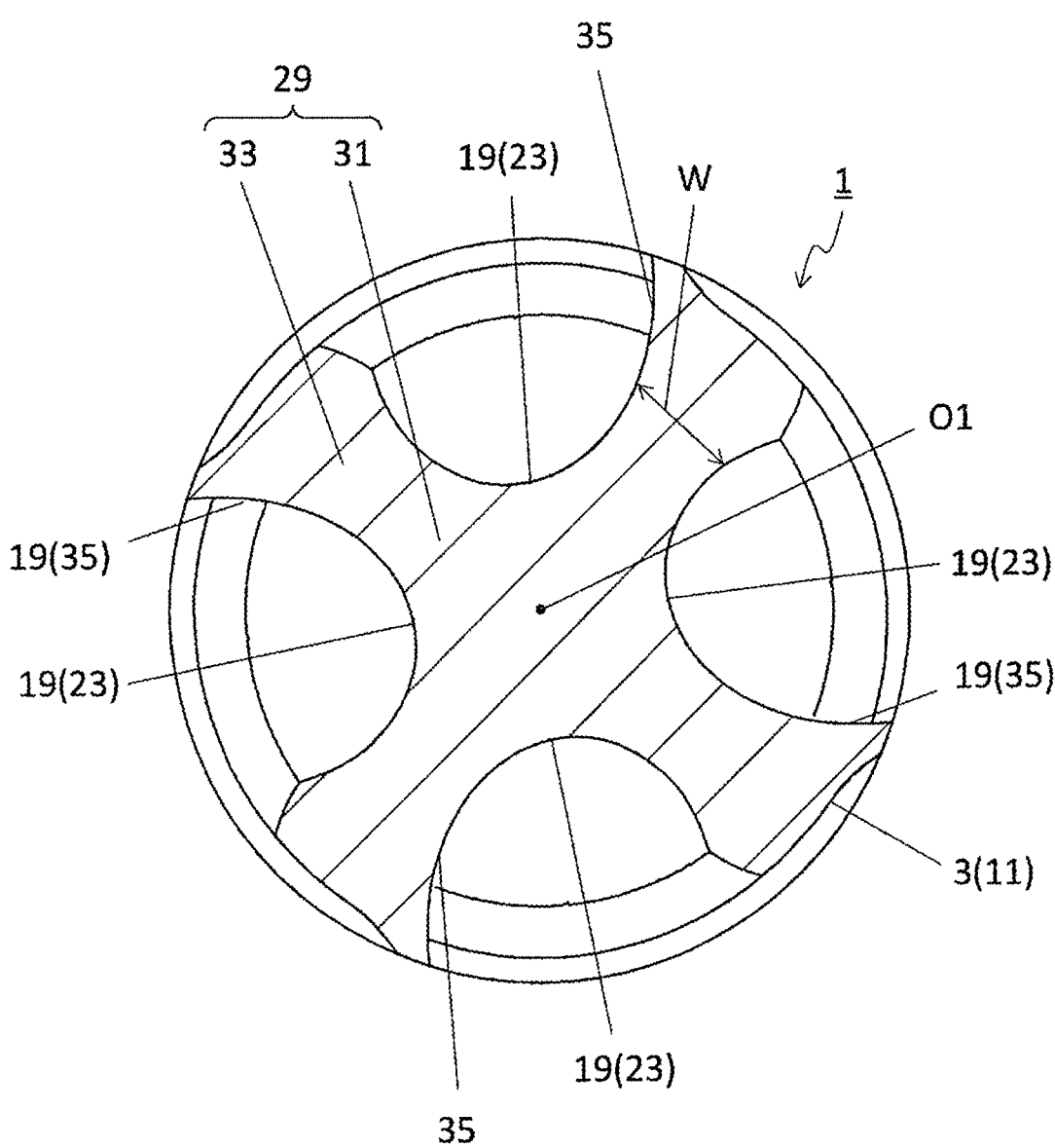
FIG. 8 is a sectional view taken along the line VIII-VIII in the rotary tool illustrated in FIG. 5.

The second flute 19 may include a second bottom part 23 having a circular arc shape and including a portion located closest to the central axis O1 in a second cross section of the second part 11 orthogonal to the central axis O1, as in a non-limiting embodiment illustrated in FIG. 8. An imaginary circle overlapping with the second bottom part 23 may be a second imaginary circle C21 in the second cross section as in a non-limiting embodiment illustrated in FIG. 9. A center O21 of the second imaginary circle C21 may be located inside a circumscribed circle C22 of the second part 11.

In the above case, chips generated by the second cutting edge 17 may be less likely to fly out of the second flute 19, specifically, out of the circumscribed circle C22 of the second part 11. A surface of a machined hole of the workpiece may therefore be less prone to damage. For example, if the second cutting edge 17 is used as a finishing cutting edge, it may be possible to provide the machined hole having a good finished surface. Consequently, if the center O11 of the first imaginary circle C11 and the center O21 of the second imaginary circle C21 are located as described above, cutting resistance may be reducible and enhanced chip discharge performance may be attainable.

The first imaginary circle C11 may be overlapped with the first bottom part 21 so that the center O11 coincides with a center of a circular arc on the first bottom part 21 in the first cross section. Similarly, the second imaginary circle C21 may be overlapped with the second bottom part 23 so that the center O21 coincides with a center of a circular arc on the second bottom part 23 in the second cross section.

The circumscribed circle C12 of the first part 9 may be a minimum circle including the whole of the first part 9 in the first cross section. The center of the circumscribed circle C12 of the first part 9 may coincide with the central axis O1 in the first cross section. These points may also be true for the circumscribed circle C22 of the second part 11.

The second cross section may be a cross section excluding at least one of an end portion on a side of the first end 3a in the second flute 19 and an end portion on a side of the second end 3b in the second flute 19. In other words, the center O21 of the second imaginary circle C21 may not be located inside the circumscribed circle C22 of the second part 11 in at least one of both end portions of the second flute 19 in a direction along the central axis O1.

Figure 7:
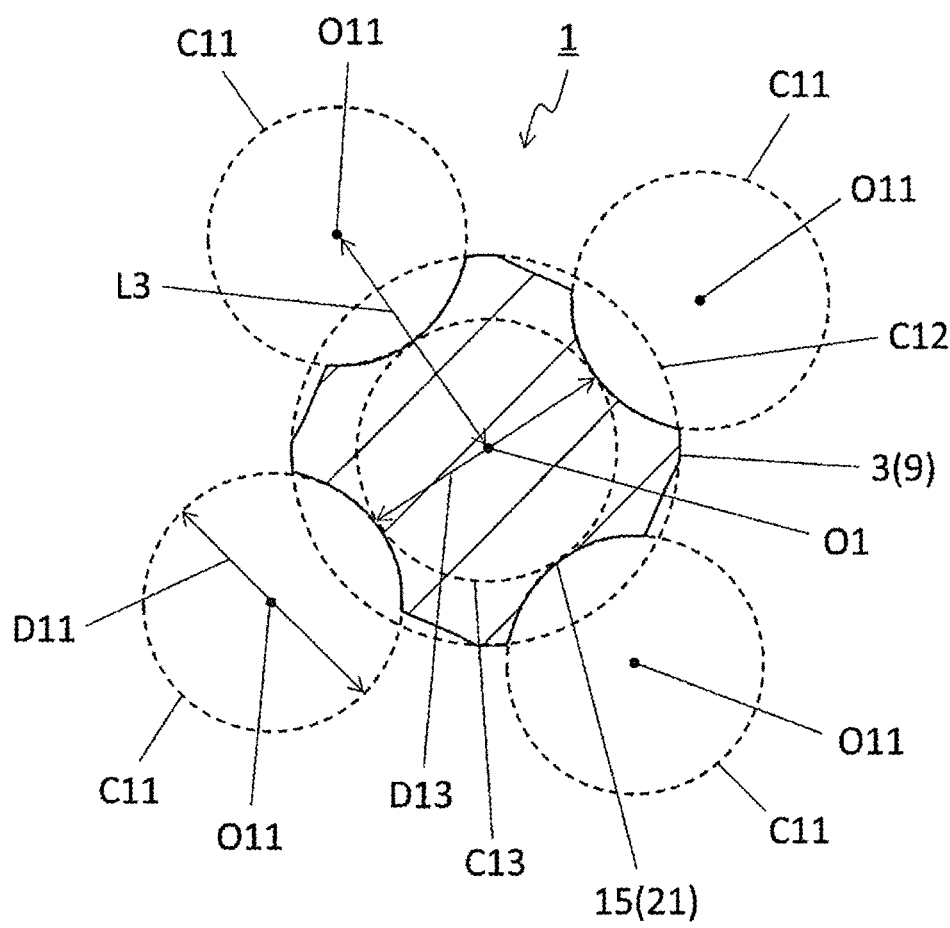
FIG. 7 is a broken-out section view of the same cross section as in FIG. 6.
Figure 9:
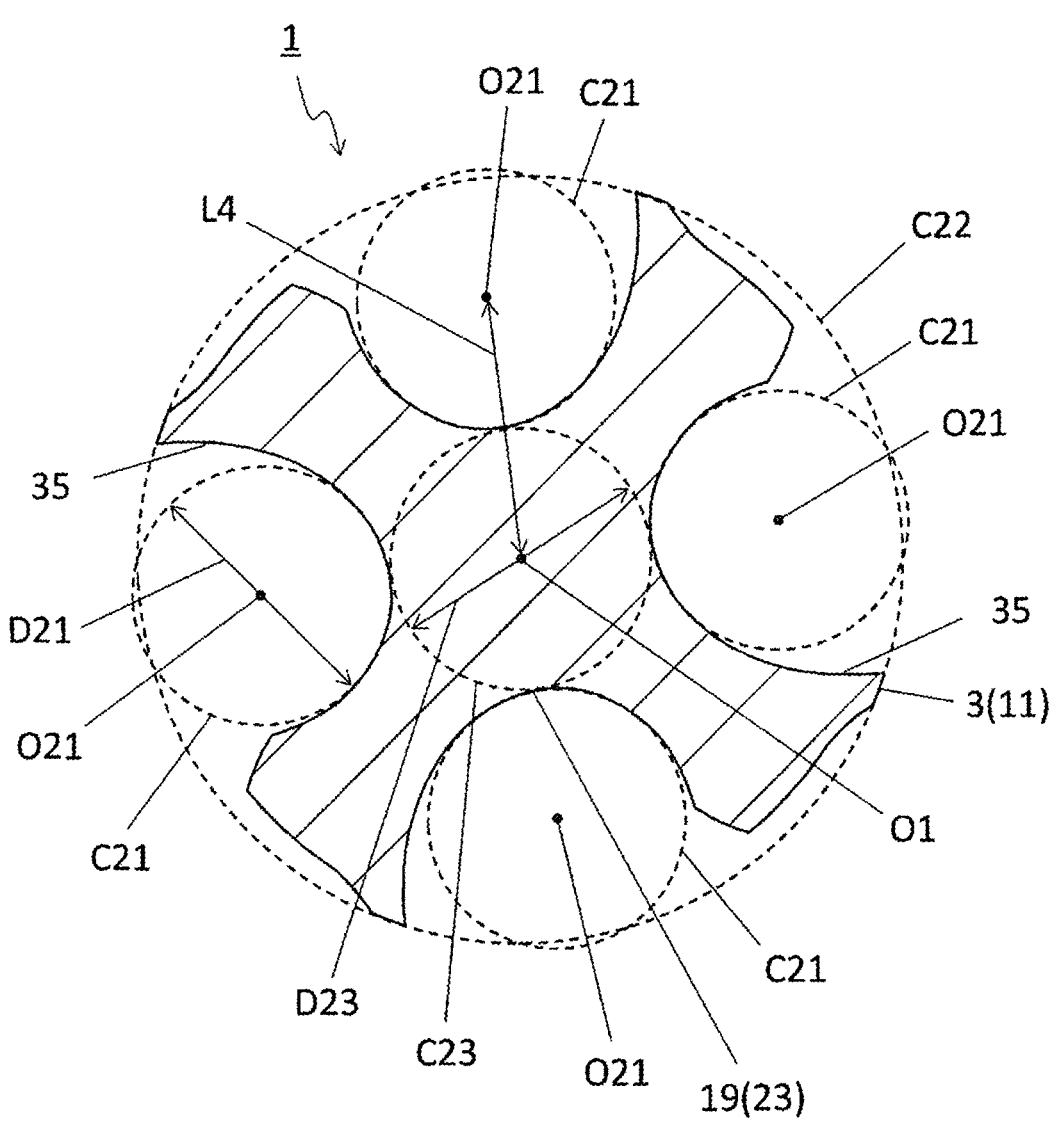
FIG. 9 is a broken-out section view of the same cross section as in FIG. 8.

The center O11 of the first imaginary circle C11 may be located inside the circumscribed circle C22 of the second part 11 in the first cross section of the first part 9 orthogonal to the central axis O1 as in the non-limiting embodiment illustrated in FIG. 6 (refer to FIGS. 7 to 9). This may make it possible to avoid that the chips generated by the first cutting edge 13 are very moderately curved when passing through the first flute 15. A surface of a machined hole of a workpiece may therefore be less prone to damage.

The first part 9 may include a plurality of the first cutting edges 13 and a plurality of the first flutes 15 as described above. The first part 9 may further include a first portion 25 located between the first flutes 15 adjacent to each other in a circumferential direction as in the non-limiting embodiment illustrated in FIG. 6. The first portion 25 may include a first region 27 whose width W in the circumferential direction becomes smaller as going away from the central axis O1 in the first cross section.

The first end 3a may be a portion that bites into a workpiece in a drilling process of the workpiece, and may therefore be likely to be subjected to a large cutting load. Thus, if the first part 9 is located so as to include the first end 3a, a large cutting load may tend to be applied the first part 9. If the first portion 25 includes the first region 27, it may be easy to ensure a large core thickness of the first part 9, and therefore the first part 9 may have high durability.

A moment of a force at an end part on a side of the outer periphery may be larger than that at an end part close to the central axis O1 in the first cutting edge 13 because the base 3 is rotated around the central axis O1 in the drilling process of the workpiece. If the first region 27 includes an end part of the first portion 25 which is close to the outer periphery, it may be high in durability against the cutting load applied to the end part on the side of the outer periphery where the moment of the force is relatively large. This may lead to high durability of the first part 9. Particularly, if the whole of the first portion 25 is the first region 27, the first part 9 may have higher durability.

The second part 11 may include a plurality of the second cutting edges 17 and a plurality of the second flutes 19 as described above. The second part 11 may further include a second portion 29 located between the second flutes 19 adjacent to each other in the circumferential direction as in the non-limiting embodiment illustrated in FIG. 8. The second portion 29 may include, in the second cross section, a second region 31 whose width W in the circumferential direction becomes smaller as going away from the central axis O1, and a third region 33 which is located closer to the outer periphery than the second region 31, and whose width W in the circumferential direction becomes larger as going away from the central axis O1.

In these cases, chips generated by the second cutting edge 17 can be stably curved on a surface of the second region 31, and chips generated by the second cutting edge 17 may be less likely to fly out of the circumscribed circle C22 of the second part 11 on a surface of the third region 33.

The first flute 15 may include a part other than the first bottom part 21 or may include only the first bottom part 21 in the first cross section of the first part 9 orthogonal to the central axis O1. Similarly, the second flute 19 may include a part other than the second bottom part 23 or may include only the second bottom part 23 in the second cross section of the second part 11 orthogonal to the central axis O1. For example, the second flute 19 may further include a rear part 35 located on a rear side in the rotation direction Y1 than the second bottom part 23 as in a non-limiting embodiment illustrated in FIG. 9.

In cases where the first flute 15 includes only the first bottom part 21 in the first cross section as in the non-limiting embodiment illustrated in FIG. 7, it may be easy to ensure a large thickness of the first part 9 while ensuring a space where the chips are moderately curved. In cases where the second flute 19 includes the second bottom part 23 and the rear part 35, and the rear part 35 has a larger radius of curvature than the second bottom part 23 in the second cross section as in the non-limiting embodiment illustrated in FIG. 9, it may be easy to ensure a large space for the second flute 19 while ensuring a large core thickness of the second part 11. Consequently, the chips may be less likely to come into contact with the surface of the second flute 19, thereby enhancing chip discharge performance.

A diameter D11 of the first imaginary circle C11 may be equal to or different from the core thickness of the first part 9. The core thickness may be one of indexes for measuring rigidity of the rotary tool 1. The core thickness of the first part 9 may be a diameter of a maximum circle formable in the first cross section, namely, a diameter D13 of an inscribed circle C13 in the first cross section. A center of the inscribed circle C13 in the first cross section may coincide with the central axis O1.

The fact that the diameter is equal to the core thickness is not intended to limit that both are strictly identical. For example, there may be a difference of approximately 10% between the diameter and the core thickness. The core thickness of the first part 9 is not limited to a specific value. For example, the core thickness of the first part 9 may be approximately 50-80% of an outer diameter of the first part 9.

A diameter D21 of the second imaginary circle C21 may be equal to or different from the core thickness of the second part 11. The core thickness of the second part 11 may be defined similarly to the core thickness of the first part 9. That is, the core thickness of the second part 11 may be a diameter D23 of an inscribed circle C23 in the second cross section. A center of the inscribed circle C23 in the second cross section may coincide with the central axis O1.

The core thickness of the second part 11 is not limited to a specific value. For example, the core thickness of the second part 11 may be approximately 10-30% of an outer diameter of the second part 11.

A depth of the first flute 15 and a depth of the second flute 19 are not limited to a specific value. For example, the depth of the first flute 15 may be approximately 10-25% of the outer diameter of the first part 9. The depth of the second flute 19 may be approximately 25-40% of the outer diameter of the second part 11. The depth of the first flute 15 may be a value obtained by subtracting a distance between a portion closest to the central axis O1 in the first bottom part 21 and the central axis O1 in the first cross section from a radius of the first part 9. The depth of the second flute 19 may be defined similarly to the depth of the first flute 15.

A length L3 of a line segment connecting the center O11 of the first imaginary circle C11 and the central axis O1 may be equal to or different from a length L4 of a line segment connecting the center O21 of the second imaginary circle C21 and the central axis O1. The term "being identical in length" is not intended to limit to "being strictly identical." For example, there may be a difference of approximately 10% between two lengths to be compared.

The diameter D11 of the first imaginary circle C11 may be equal to or different from the diameter D21 of the second imaginary circle C21. In cases where the diameter D11 is equal to the diameter D21 as in the non-limiting embodiment illustrated in FIGS. 7 and 9, if chips generated by the first cutting edge 13 flow through the first flute 15 and then flow in the second flute 19, the chips may tend to be smoothly flow through the second flute 19. The term "being identical in diameter" may be defined similarly to the cases where the diameter is equal to the core thickness.

The whole of the second imaginary circle C21 may be located inside the circumscribed circle C22, or alternatively a part of the second imaginary circle C21 may be located outside the circumscribed circle C22 in the second cross section.

For example, cemented carbide and cermet may be usable as a material of the base 3. Examples of composition of the cemented carbide may include WC—Co, WC—TiC—Co and WC—TiC—TaC—Co, in which WC, TiC and TaC may be hard particles, and Co may be a binding phase.

The cermet may be a sintered composite material obtainable by compositing metal into a ceramic component. Examples of the cermet may include titanium compounds composed mainly of titanium carbide (TiC) or titanium nitride (TiN). The above materials may be shown by way of illustration, and the material of the base 3 is not limited thereto.

A surface of the base 3 may be coated with a coating film by using chemical vapor deposition (CVD) method or physical vapor deposition (PVD) method. Examples of composition of the coating film may include titanium carbide (TiC), titanium nitride (TiN), titanium carbonitride (TiCN) and alumina ($Al_2O_3$).

<Method for Manufacturing Machined Product>

A method for manufacturing a machined product 101 in a non-limiting embodiment of the present disclosure may be described below with reference to the drawings.

The machined product 101 may be manufacturable by carrying out a cutting process of a workpiece 103. A method for manufacturing the machined product 101 in the non-limiting embodiment of the present disclosure may include the following steps (1) to (4).

8

Figure 10:
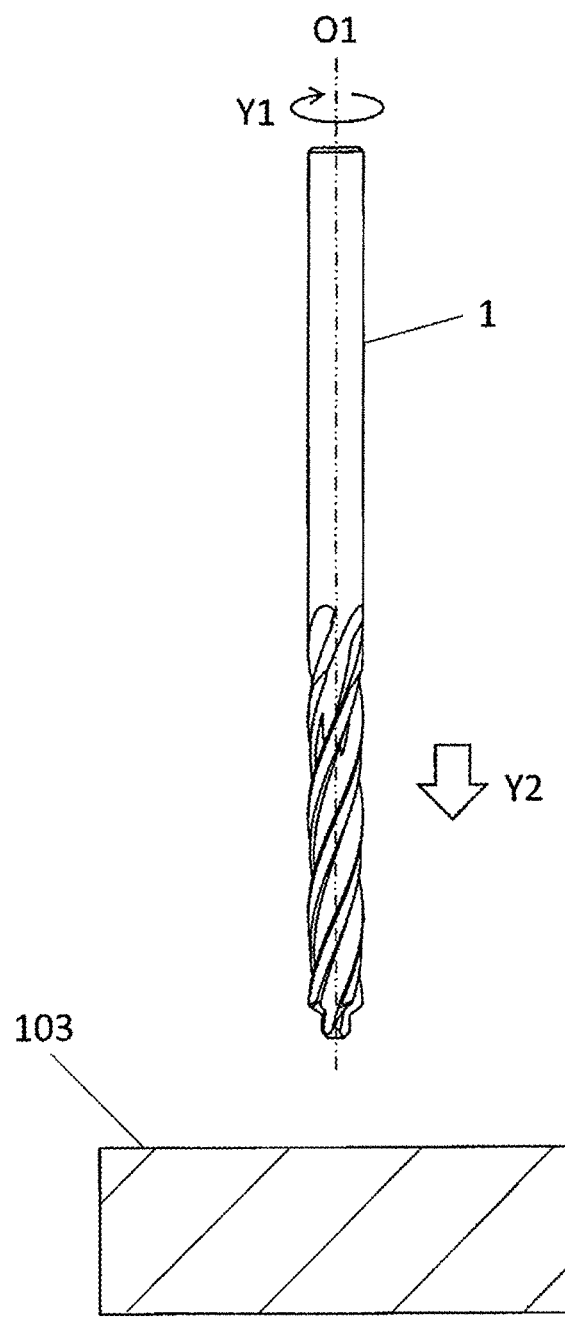
FIG. 10 is a schematic diagram illustrating one of steps in a method for manufacturing a machined product in a non-limiting embodiment of the present disclosure.

(1) Putting the rotary tool 1 above the prepared workpiece 103 (refer to FIG. 10).

Figure 11:
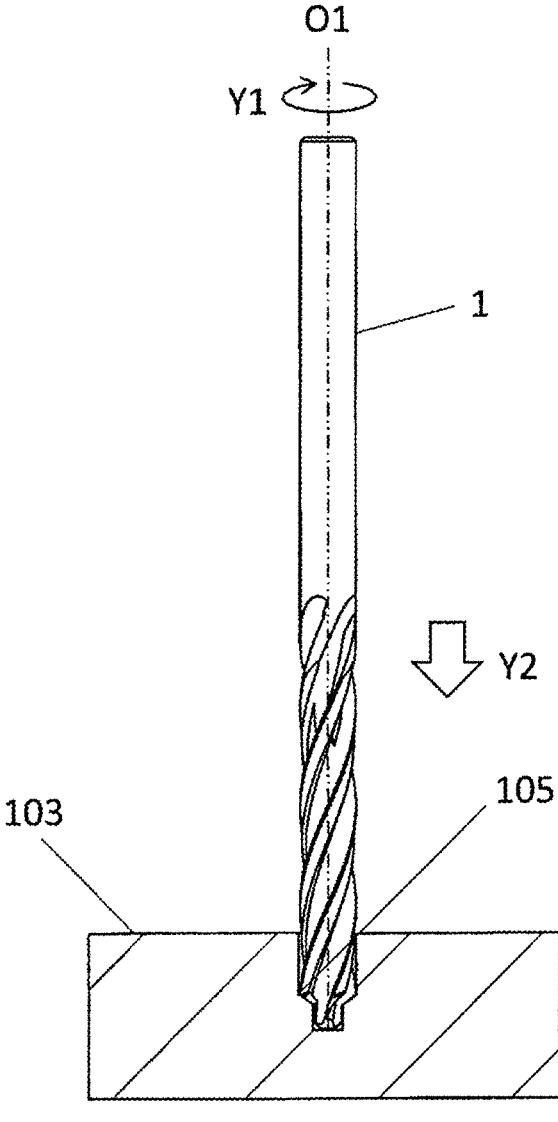
FIG. 11 is a schematic diagram illustrating one of the steps in the method for manufacturing a machined product in the non-limiting embodiment of the present disclosure.

(2) Rotating the rotary tool 1 around the central axis O1 in a direction of an arrow Y1, and bringing the rotary tool 1 near the workpiece 103 in a Y2 direction (refer to FIGS. 10 and 11).

The above steps (1) and (2) may be carried out by, for example, fixing the workpiece 103 to a table of a machine tool with the rotary tool 1 attached thereto, and by bringing the rotary tool 1 being rotated near the workpiece 103. In the step (2), the workpiece 103 and the rotary tool 1 may be brought close to each other. For example, the workpiece 103 may be brought near the rotary tool 1.

(3) Forming a machined hole 105 in the workpiece 103 by bringing the rotary tool 1 further near the workpiece 103 so that the rotary tool 1 being rotated comes into contact with a desired position on a surface of the workpiece 103 (refer to FIG. 11).

In the step (3), the cutting process may be carried out so that at least a part of the cutting part 5 in the base 3 is located in a machined hole 105. Alternatively, setting may be made so that the shank part 7 in the base 3 is located outside the machined hole 105. From the viewpoint of obtaining a good finished surface, setting may be made so that a part of the cutting part 5 which is located close to the second end 3b is located outside the machined hole 105. The above part may be servable as a margin region for discharging chips, thereby offering excellent chip discharge performance through the region.

Figure 12:
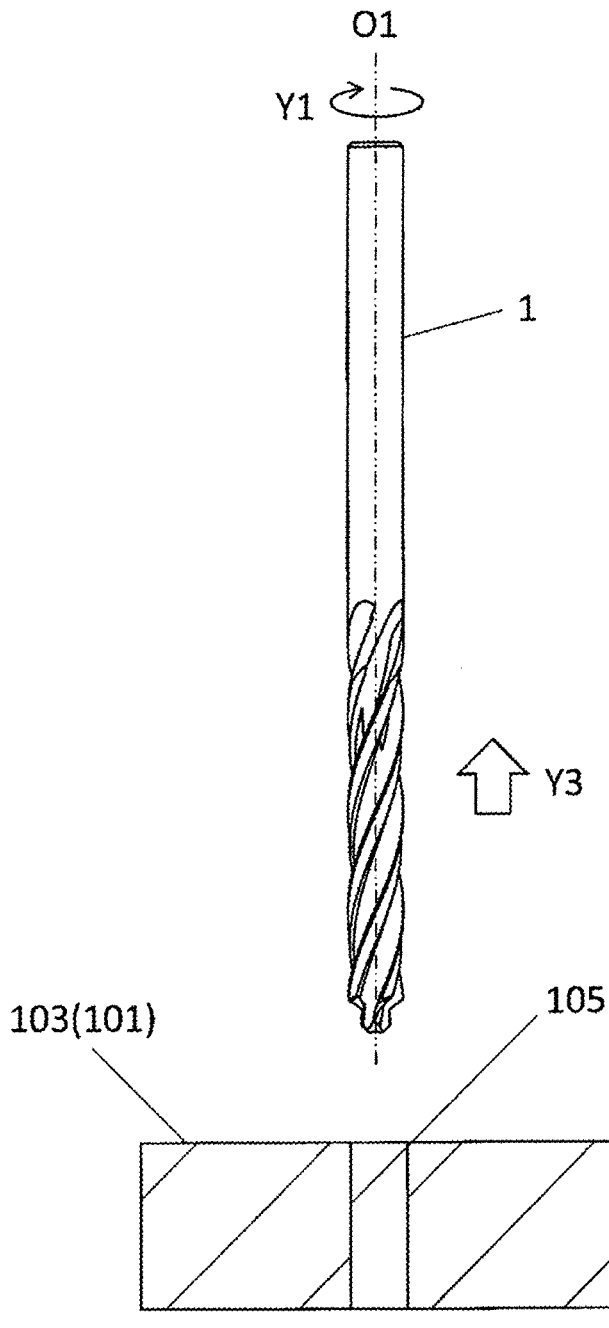
FIG. 12 is a schematic diagram illustrating one of the steps in the method for manufacturing a machined product in the non-limiting embodiment of the present disclosure.

(4) Moving the rotary tool 1 away from the workpiece 103 in a Y3 direction (refer to FIG. 12).

Similarly to the step (2), also in the step (4), the workpiece 103 and the rotary tool 1 may be separated from each other. For example, the workpiece 103 may be moved away from the rotary tool 1.

Excellent machinability can be offered by undergoing the foregoing steps. Specifically, if using the rotary tool 1 in the method for manufacturing the machined product 101 in the non-limiting embodiment of the present disclosure, cutting resistance may be reducible and enhanced chip discharge performance may be attainable. It may therefore be possible to obtain the machined product 101 having the highly accurate machined hole 105.

In cases where the above cutting process of the workpiece 103 is carried out a plurality of times and, for example, a plurality of machined holes 105 are formed in the single workpiece 103, the step of bringing the first cutting edge 13 and the second cutting edge 17 of the rotary tool 1 into contact with different portions of the workpiece 103 may be repeated while keeping the rotary tool 1 rotated.

Examples of material of the workpiece 103 may include aluminum, carbon steel, alloy steel, stainless steel, cast iron, nonferrous metals and carbon-fiber-reinforced plastic (hereinafter also referred to as "CFRP"). The workpiece 103 may be a laminate including a CFRP layer. The laminate may further include a metal layer, such as an aluminum layer. For example, the above laminate may be usable as a material of airplanes or the like.

The invention claimed is:

1. A rotary tool, comprising:
   a base extended along a central axis from a first end to a second end,
   the base comprising
   a first part including the first end, and
   a second part which is located closer to the second end than the first part and has a larger outer diameter than the first part, the first part comprising a plurality of first cutting edges located on the first end, a plurality of first flutes extended from the plurality of first cutting edges, respectively, toward the second end, and a first portion defined by an entire portion located between two first flutes of the plurality of first flutes adjacent to each other in a circumferential direction, the second part comprising a second cutting edge located on an end part of the second part and closer to the first end than the second end, and a second flute extended from the second cutting edge toward the second end, wherein in a first cross section of the first part orthogonal to the central axis, each of the plurality of first flutes comprises a first bottom part having a first circular arc shape, the first bottom part including a portion located closest to the central axis, and an imaginary circle overlapping with the first bottom part is a first imaginary circle, and a center of the first imaginary circle is located outside a circumscribed circle of the first part, in a second cross section of the second part orthogonal to the central axis, the second flute comprises a second bottom part having a second circular arc shape, the second bottom part including a portion located closest to the central axis, and an imaginary circle overlapping with the second bottom part is a second imaginary circle, and a center of the second imaginary circle is located inside a circumscribed circle of the second part, and the second circular arc shape of each of the plurality of second flutes is different than the first circular arc shape of each of the plurality of first flutes, in the first cross section of the first part orthogonal to the central axis, an entirety of the first portion is bounded by the first circular arc shape of each first bottom part of the two first flutes of the plurality of first flutes adjacent to each other in the circumferential direction, an outer periphery of the first part, and an imaginary line connecting a respective end of each circular arc shape of the two first flutes adjacent to each other in the circumferential direction, each end being a furthest part of each circular arc shape from the outer periphery between the two first flutes adjacent to each other in the circumferential direction, the first circular arc shapes of the two first flutes of the plurality of first flutes adjacent to each other in the circumferential direction intersect the outer periphery of the first part, a length of the imaginary line defines a largest width of the entirety of the first portion, and a width of the entirety of the first portion continuously becomes narrower in a direction going away from the central axis, the width of the entirety of the first portion is measured perpendicular to a radial line extending from the central axis and is measured between the first circular arc shapes of the first bottom parts of the two first flutes adjacent to each other in the circumferential direction, and each of the plurality of first flutes comprises only the first bottom part having the first circular arc shape.

2. The rotary tool according to claim 1, wherein the center of the first imaginary circle is located inside the circumscribed circle of the second part in the first cross section.

3. The rotary tool according to claim 1, wherein the second part comprises a plurality of second cutting edges including the second cutting edge, a plurality of second flutes including the second flute, and a second portion defined by an entire portion located between two second flutes of the plurality of second flutes adjacent to each other in the circumferential direction, the second portion comprises, in the second cross section, a second region whose width measured in the circumferential direction becomes smaller in the direction going away from the central axis, and a third region which is located closer to an outer periphery of the second part than the second region, and whose width measured in the circumferential direction becomes larger in the direction going away from the central axis.

4. The rotary tool according to claim 1, wherein each of the plurality of first flutes comprises only the first bottom part in the first cross section, the second flute further comprises a rear part located on a rear side in a rotation direction of the rotary tool from the second bottom part in the second cross section, and a radius of curvature of the rear part is larger than a radius of curvature of the second bottom part.

5. The rotary tool according to claim 1, wherein in the first cross section, the first imaginary circle has a portion overlapping the first circular arc shape of the first bottom part, and in the second cross section, the second imaginary circle has a portion overlapping the second circular arc shape of the second bottom part.

6. The rotary tool according to claim 1, wherein in the first cross section of the first part orthogonal to the central axis, a core thickness of the first part is equal to a diameter of the first imaginary circle.

7. The rotary tool according to claim 1, wherein in the first cross section of the first part orthogonal to the central axis, the first circular arc shape of the first bottom part matches an arc portion of the first imaginary circle, and in the second cross section of the second part orthogonal to the central axis, the second circular arc shape of the second bottom part matches an arc portion of the second imaginary circle.

8. The rotary tool according to claim 1, wherein in the first cross section of the first part orthogonal to the central axis, an entirety of the first circular arc shape of the first bottom part matches an arc portion of the first imaginary circle.

9. The rotary tool according to claim 8, wherein in the first cross section of the first part orthogonal to the central axis, a core thickness of the first part is equal to a diameter of the first imaginary circle.

10. A method of manufacturing a machined product, the method comprising:

rotating the rotary tool of claim 1;

bringing the rotary tool being rotated into contact with a
    workpiece; and moving the rotary tool away from the workpiece.

* * * * *